July 24, 1934.   J. GASKELL   1,967,932
APPARATUS FOR THE PRODUCTION OF WIRED GLASS
Filed March 6, 1933
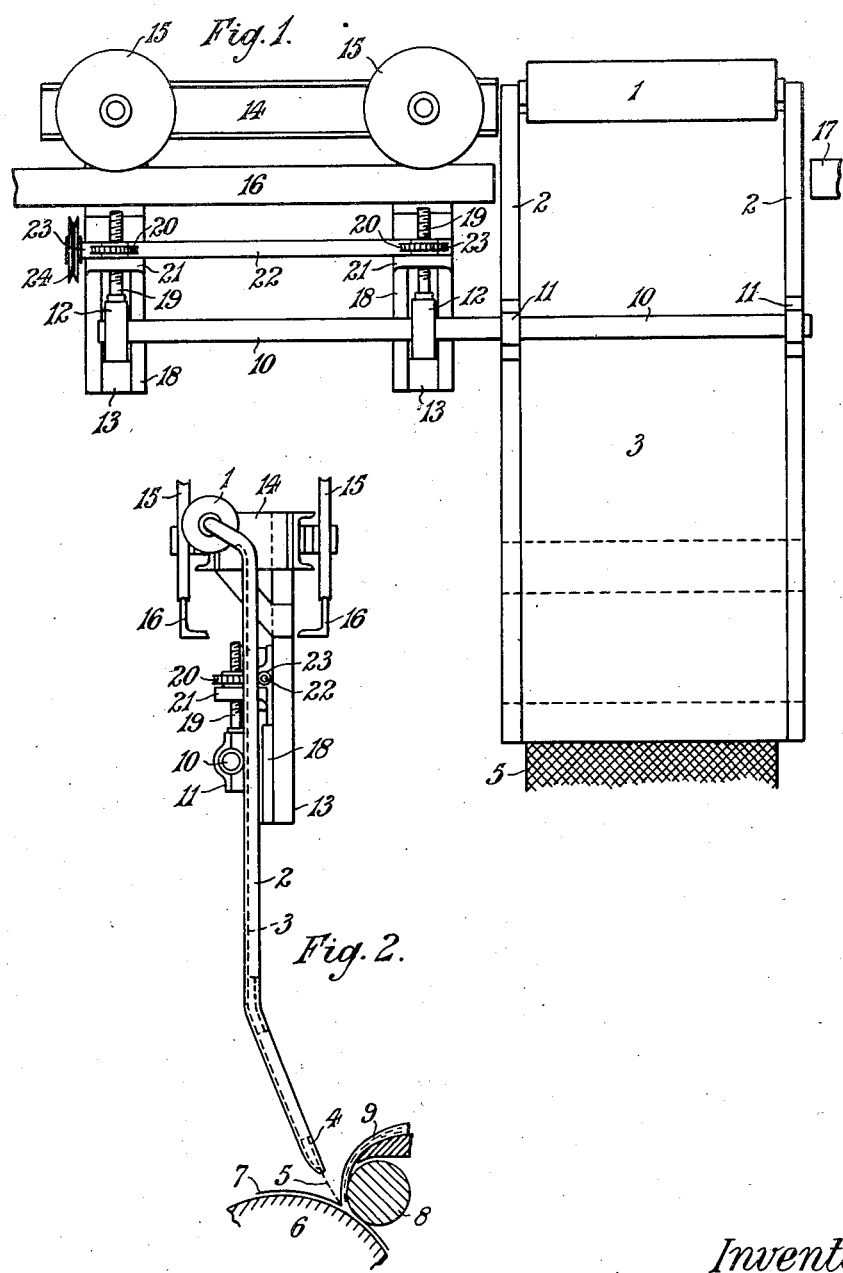
Inventor.
Joseph Gaskell
BY
Morrison, Kennedy & Campbell
Attorneys.

Patented July 24, 1934

UNITED STATES PATENT OFFICE 1,967,932

APPARATUS FOR THE PRODUCTION OF WIRED GLASS

Joseph Gaskell, St. Helens, England, assignor to Pilkington Brothers Limited, Liverpool, England, a company of England Application March 6, 1933, Serial No. 659,677 In Great Britain March 12, 1932

1 Claim. (Cl. 49—32)

This invention relates to apparatus for the production of wired glass and has for its object an improved apparatus for the supply of wire net to the glass rolling machine.

The invention is applicable to the supply of wire net to various types of glass rolling machine, but is of particular advantage when applied to continuous rolling apparatus.

In order to ensure the wire net occupying a correct central position between the two layers of glass under the varying conditions which obtain in practice, it is of advantage that the wire net be guided to a line close to the line at which it enters the glass, and that this guiding line be adjustable to any desired position.

Further, when the roll of net is exhausted, it is of advantage that net from a fresh roll be brought into position to enter the glass in the shortest time possible. In methods heretofore practised, a fresh roll has to be put in position and the net from the roll passed through the guiding means, and, in the case of continuous rolling, glass is rolled to waste during the time required for these operations.

According to the invention a support for the roll of wire net and a guide for the wire net are on a frame which is carried by a conveyor, whereby the support and guide can be removed from its operative position and their place taken by a duplicate support and guide. The frame is preferably adjustable relative to the conveyor rails in two directions mutually perpendicular, being carried on and rotatable round a shaft parallel to the conveyor rails, which is adapted to slide vertically in a support integral with the conveyor. The guide is preferably a sheet metal tray co-operating at its lower end with a plate to form a mouth through which the wire net issues and by which it is located.

In the accompanying drawing, Figure 1 is a front elevation of the apparatus and Figure 2 is a side elevation looking at the right-hand end of Figure 1. In Figure 2 part of the rolling apparatus is shown diagrammatically.

The roll of wire net 1 is supported between two angle irons 2 to which a sheet metal tray 3 (shown by dotted line in Figure 2) is attached. A covering plate 4 is attached to the lower ends of the angle irons 2 and forms with the end of the tray 3 a mouth from which the wire net 5 issues.

The rolling apparatus shown by way of example consists of a lower roller 6 on which a strip of glass 7 has been rolled (by means not shown) and an upper roller 8 over which a stream of glass 9 flows, to be rolled on to the strip 7. The wire net 5 enters the glass close to the pass between the rollers 6 and 8.

The above-described wire net supporting and guiding device will be called the wire net frame 2, 3.

The wire net frame 2, 3 is supported on a shaft 10 passing through bearings 11 fixed to the angle irons 2. The bearings 11 are so adjusted that the wire net frame 2, 3 can turn stiffly about the shaft 10. By turning it, the lower end of the wire net frame 2, 3 can be adjusted in position substantially horizontally.

The shaft 10 is mounted in two blocks 12 carried on supports 13 depending from a framework 14, which is adapted to run, by means of four wheels 15 on a runway 16.

By running the framework 14 to the left (as shown in Figure 1) the wire net frame 2, 3 is removed from its operative position. A duplicate apparatus, similar to that described above, but with the relative positions of framework 14 and wire net frame 2, 3 reversed, is adapted to run on a second runway 17.

When the roll of wire net is exhausted, the wire net frame 2, 3 is removed to the left, as described and, simultaneously a duplicate wire net frame is brought into operative position by running the duplicate framework 14 to the left on the runway 17. The duplicate wire net, which has already been passed from the roll down the tray and through its mouth, is thereby brought into position to enter the glass within a few seconds of the former roll being exhausted.

The blocks 12 are carried on the supports 13 in such a way that the wire net frame 2, 3 can be adjusted in position vertically. The blocks 12 are adapted to slide in guides 18 on the supports 13, and screws 19, attached to the blocks 12, engage nuts formed in worm wheels 20 which are supported on brackets 21 attached to the supports 13. A shaft 22 in bearings 23 on the supports 13, carries worms engaging the wormwheels 20, and is adapted to be turned by hand chain wheel 24. By turning the wheel 24 the blocks 12, with the shaft 10, can be raised or lowered, thereby adjusting the wire net frame 2, 3, in its vertical position.

From the above description it will be seen that the wire net frame 2, 3 and the duplicate frame can be adjusted so that the mouth is in any desired position and that this adjustment is independent of the movement of the frame into and out of operative position. Consequently, when a wire net frame, with the net issuing therefrom, is brought into operative position, the wire net occupies the desired position relatively to the glass.

Having described my invention, I declare that what I claim and desire to secure by Letters Patent is:—

Apparatus for rolling wire glass comprising a frame carrying a support for a roll of wire net and a guide adapted to guide the wire net towards its line of entrance into the glass, means for adjusting the guide relatively to the frame in two directions perpendicular to each other and to the axes of the glass rolls and a runway on which the frame is adapted to travel in a direction parallel to the axes of the rolls.

JOSEPH GASKELL.